United States Patent [19]

Schwark

[11] Patent Number: 5,155,181

[45] Date of Patent: * Oct. 13, 1992

[54] (THIO)AMIDE-MODIFIED SILAZANE POLYMER COMPOSITION CONTAINING A FREE RADICAL GENERATOR

[75] Inventor: Joanne M. Schwark, Wilmington, Del.

[73] Assignee: Hercules Incorporated, Wilmington, Del.

[*] Notice: The portion of the term of this patent subsequent to Jul. 16, 2008 has been disclaimed.

[21] Appl. No.: 699,414

[22] Filed: May 14, 1991

Related U.S. Application Data

[63] Continuation-in-part of Ser. No. 441,667, Nov. 27, 1989, Pat. No. 5,032,649.

[51] Int. Cl.$^5$ .......................................... C08F 283/00
[52] U.S. Cl. ..................................... 525/474; 528/21; 528/24; 528/26; 528/28
[58] Field of Search .................. 528/26, 28, 21, 24; 525/474

[56] References Cited

U.S. PATENT DOCUMENTS

| | | | |
|---|---|---|---|
| 4,482,669 | 11/1984 | Seyferth et al. | 524/442 |
| 4,689,252 | 8/1987 | Lebrun et al. | 427/228 |
| 4,722,988 | 2/1988 | Forte et al. | 528/28 |
| 4,771,118 | 9/1988 | Takamizawa et al. | 528/14 |
| 4,870,035 | 9/1989 | Takamizawa et al. | 501/88 |
| 4,929,704 | 5/1990 | Schwark | 528/28 |
| 5,021,533 | 6/1991 | Schwark | 528/28 |
| 5,032,649 | 7/1991 | Schwark | 525/474 |

FOREIGN PATENT DOCUMENTS

| | | |
|---|---|---|
| 379819 | 8/1990 | European Pat. Off. |
| 2599745 | 12/1987 | France |

Primary Examiner—Melvyn I. Marquis
Attorney, Agent, or Firm—Joanne W. Patterson

[57] ABSTRACT

A composition that comprises a (thio)amide-modified silazane polymer containing at least one alkenyl or alkynyl group and a free radical generator can be cross-linked by an energy input provided in the form of heat, ultraviolet radiation, or an electron beam. The cross-linked (thio)amide-modified silazane polymer composition can be pyrolyzed to form a silicon nitride-containing ceramic.

11 Claims, No Drawings

(THIO)AMIDE-MODIFIED SILAZANE POLYMER COMPOSITION CONTAINING A FREE RADICAL GENERATOR

This application is a continuation-in-part of U.S. Ser. No. 07/441,667 filed Nov. 27, 1989, U.S. Pat. No. 5,032,649 issued Jul. 16, 1991.

FIELD OF THE INVENTION

This invention relates to curable (thio)amide-modified silazane polymer compositions.

BACKGROUND OF THE INVENTION

Silicon nitride has generated considerable interest as a ceramic material because of its high thermal and oxidative stability and extreme hardness. Other advantageous properties include low electrical conductivity, low coefficient of thermal expansion, excellent thermal shock and creep resistance, high strength at elevated temperatures and excellent corrosion resistance.

One method for obtaining silicon nitride-containing ceramic materials is the pyrolysis of polyorganosilazanes. Seyferth et al. (U.S. Pat. No. 4,482,669) describe the crosslinking of the ammonolysis product of an organodihalosilane in the presence of a basic catalyst such as an alkali metal amide to form a polysilazane ceramic precursor. This material is especially useful as a binder for ceramic powders. Burns (U.S. Pat. No. 4,774,312) describes a process for preparing a crosslinkable polydisilacyclobutasilazane ceramic precursor by reacting chlorodisilacyclobutane with cyclic silazanes. A catalyst such as a metal hydride or metal amide, e.g., lithium diethylamide, can be used for the crosslinking reaction. The preparation of polysilazane ceramic precursors is also described, for example, in U.S. Pat. Nos. 4,689,252 (Lebrun and Porte); 4,612,383 (Laine and Blum); 4,675,424 (King et al.) and 4,722,988 (Porte and Lebrun).

In general, the above methods are deficient in that it is difficult or impossible to control the viscosities of the polysilazanes so that they are suitable for the intended end use of the polymer. For example, low viscosities are desirable for polymers used to produce thin films or to infiltrate porous ceramic bodies, and high viscosities are desirable for making fibers.

SUMMARY OF THE INVENTION

The (thio)amide-modified silazane polymer compositions of this invention are capable of being crosslinked by an energy input and comprise (a) a (thio)amide-modified silazane polymer having at least one 2–6 carbon alkenyl or alkynyl group and (b) at least one free radical generator in an amount effective to crosslink the (thio)amide-modified silazane polymer. The notation "(thio)amide-modified" is meant to include silazane polymers modified by organic amides and organic thioamides.

The cured or uncured (thio)amide-modified silazane polymers can be used to prepare silicon nitride-containing ceramic materials by heating to a temperature of at least 800° C. in an inert or ammonia-containing atmosphere.

DETAILED DESCRIPTION OF THE INVENTION

The first step of the preferred process for preparing the (thio)amide-modified silazane polymers of this invention comprises reacting ammonia, or a mixture of ammonia and a substituted or unsubstituted 1–4 carbon alkyl or aryl amine, with a halogenated silicon compound selected from the group consisting of $RSiX_3$, $RR'SiX_2$ and mixtures thereof, including mixtures where more than one compound having the formula $RSiX_3$ or $RR'SiX_2$ is used. Optionally, $RR'R''SiX$, $SiX_4$ or mixtures thereof can also be present in the reaction mixture. X can be Cl, Br, or I. Cl is preferred. R, R' and R'' can be the same or different and are selected from the group consisting of H, substituted or unsubstituted 1–6 carbon alkyl, aryl, 2–6 carbon alkenyl and 2–6 carbon alkynyl groups. The reaction mixture must contain at least one halogenated silicon compound having a Si—H bond and at least one halogenated silicon compound having an alkenyl or alkynyl group. Examples of halogenated silicon compounds suitable for use in the process of this invention include, but are not limited to, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, vinylethyldichlorosilane, allylmethyldichlorosilane, allyltrichlorosilane, phenylallyldichlorosilane, phenylvinyldichlorosilane, 4-but-1-enyldichloromethylsilane, 6-hex-1-enyltrichlorosilane, phenyldichlorosilane, dimethyldichlorosilane, phenylmethyldichlorosilane, dimethyldibromosilane, trimethylchlorosilane, dimethylchlorosilane, dimethylvinylchlorosilane, and trimethylbromosilane.

The ammonolysis product that is formed also contains Si—H bonds. When ammonia alone is reacted with the halogenated silicon compound, the ammonolysis product is predominantly a mixture of cyclic compounds of varying ring size, but can possibly contain small amounts (usually less than 1%) of linear species. When a mixture of ammonia and an alkyl or aryl amine is used, the ammonolysis product contains more linear than cyclic species.

The ammonolysis product is then mixed with from 0.1% to about 30%, based on the weight of the ammonolysis product, of an organic amide or thioamide. From 0.5% to about 5% by weight of the organic (thio)amide is preferred. After the addition of the organic (thio)amide, the mixture is heated to 30° to 300° C., preferably from 110° to 180° C., to initiate partial crosslinking as indicated by a substantial increase in molecular weight and viscosity, e.g., an increase in viscosity from 15 to 20,000 cp at 25° C., and evolution of hydrogen gas. The reaction can be carried out with or without a solvent, although it is preferably carried out without a solvent. Although the exact reaction mechanism is not known, it is believed that the first step of the reaction is the cleavage of the bond between a nitrogen atom and a silicon atom bonded to hydrogen and insertion of the C=O or C=S of the (thio)amide between the Si and N atoms, accompanied by evolution of hydrogen gas. There is no crosslinking, and therefore no evolution of hydrogen gas, if Si—H bonds are not present in the ammonolysis product.

The (thio)amide-modified silazane polymer that is formed can be a liquid that is soluble in common organic solvents and is stable in the absence of moisture. Alternatively, solids can be formed by reaction with higher concentrations of (thio)amides at high temperatures. These solid polymers are not generally soluble in common organic solvents.

The organic (thio)amides used in the process of this invention can be monofunctional or polyfunctional, substituted or unsubstituted 1–6 carbon alkyl, aryl, 2–6 carbon alkenyl or 2–6 carbon alkynyl compounds. Suitable organic (thio)amides include, but are not limited to, acetamide, N-methylacetamide, N,N-dimethylacetamide, benzamide, thiobenzamide, formamide, N-methylformamide, dimethylformamide, urea, N-methylurea, 1,1-diemthylurea, 1,3-dimethylurea and 1-methyl-2-thiourea.

The viscosity of the final product can be controlled by varying the amount of the organic (thio)amide that is reacted with the silazane ammonolysis product. Low levels of reactant produce low viscosity polymers, while higher levels produce extremely viscous polymers or solids. The viscosity is also affected by the heating temperature, i.e., higher temperatures yield higher viscosities. The viscosity can therefore be tailored to the end use of the polymer.

Although the preferred silazane polymers for reaction with the (thio)amide are prepared by the ammonolysis reaction described above, any silazane polymer containing at least one alkenyl or alkynyl group and at least one Si—H bond can be used. Silazane polymer is meant to include cyclic oligomers and ring-based and linear polymers.

The (thio)amide-modified silazane polymers of this invention contain at least one alkenyl or alkynyl group and can be further crosslinked, i.e., cured, through the alkenyl or alkynyl unsaturation by supplying energy to generate free radicals. For example, the polymer can be heated to a temperature of 30° to 300° C., preferably 100° to 200° C., in the presence of a radical source such as a peroxide. When liquid polymers are heated in the presence of a peroxide, solid polysilazanes are produced. The polymers can also be crosslinked by exposing the polymer to UV light or electron beam radiation.

The (thio)amide-modified silazane polymer compositions of this invention contain a free radical generator in an amount effective to crosslink the polymer. Suitable free radical generators include, for example, peroxides and azo compounds.

An effective quantity of a free radical generator means a quantity sufficient to crosslink the (thio)amide-modified silazane polymer properly. The concentration of the free radical generator is generally from 0.01 to 5.0 wt. % of the polymer.

Exemplary peroxides for use in the present invention include, in particular, diaroyl peroxides such as dibenzoyl peroxide, di-p-chlorobenzoyl peroxide, and bis-2,4-dichlorobenzoyl peroxide; dialkyl peroxides such as 2,5-dimethyl-2,5-di(t-butylperoxy)hexane and di-t-butyl peroxide; diaralkyl peroxides such as dicumyl peroxide; alkyl aralkyl peroxides such as t-butyl cumyl peroxide and 1,4-bis(t-butylperoxyisopropyl)benzene; alkylaroyl peroxides; and alkylacyl peroxides such as t-butyl perbenzoate, t-butyl peracetate, and t-butyl peroctoate.

It is also possible to use peroxysiloxanes as described, for example, in U.S. Pat. No. 2,970,982 and peroxycarbonates such as t-butylperoxy isopropyl carbonate.

Symmetrical or unsymmetrical azo compounds, such as the following, may be used as free radical generators: 2,2'-azobis(2-methylpropionitrile); 2,2'-azobis(2,4-dimethyl-4-methoxyvaleronitrile); 1-cyano-1-(t-butylazo)cyclohexane; and 2-(t-butylazo)isobutyronitrile. These products are well known and are described, for example, in U.S. Pat. Nos. 2,492,763 and 2,515,628.

The (thio)amide-modified silazane polymer compositions according to the invention can additionally contain ceramic or metal fillers. Suitable fillers include, for example, $SiO_2$, $Si_3N_4$, SiC in the form of a powder or whiskers, BN, $B_4C$, AlN, $Al_2O_3$, TiN, TiC, $ZrO_2$, Si, Ti, Zr, Hf and ZrC.

The cured or uncured (thio)amide-modified silazane polymers of this invention can be pyrolyzed at a temperature of at least 800° C. under an inert or ammonia-containing atmosphere to yield a silicon nitride-containing ceramic material.

The (thio)amide-modified silazane polymers can be used in the preparation of ceramic fibers and foams, in the infiltration of a preform structure and subsequent pyrolysis to produce a composite silicon nitride-containing structure, in the production of oxidation resistant coatings, as a thin film for electronic applications, as an adhesive or sealant, as a binder for ceramic or metal powders, and in injection molding.

In the following examples, all reactions are conducted under nitrogen. Solid amides are recrystallized from dry ethanol before use and then stored in a desiccator. Liquid amides are purified by methods discussed in *Purification of Laboratory Chemicals*, 3rd Edition, by Perrin and Armarego. The amides are distilled and stored under nitrogen. For the reaction of the ammonolysis product with the organic amide, liquid amides are added by syringe. Solid amides are added to the sparged flask under a strong nitrogen flow.

EXAMPLE 1

A vinyl-substituted silazane ammonolysis product is prepared as follows. A 5 liter, three-necked flask is equipped with an overhead mechanical stirrer, a dry ice/acetone condenser ($-78°$ C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° to 69° C. After one hour, the ammonia flow is stopped and the reaction mixture is cooled to room temperature. The reaction mixture is filtered on a glass-fritted funnel to remove the precipitated ammonium chloride. The hexane is removed from the filtrate under reduced pressure (28 mm Hg, 60° C.) to give $[(CH_3SiHNH)_{0.8}(CH_3SiCH=CH_2NH)_{0.2}]_x$ as a clear oil (150.76 g, 2.34 mol, 94% yield). The oil has a viscosity of 43 cp at 25° C. and a molecular weight of 560 g/mol.

A 100 ml, one-necked flask is equipped with a stir bar and a septum and sparged with nitrogen. The flask is then charged with the ammonolysis product and 2.0 wt. % acetamide. The flask is placed in an oil bath on a stirrer/hot plate and the septum is replaced with a water condenser capped with a septum. A nitrogen inlet needle and oil bubbler outlet are placed in the septum. The reaction mixture is then heated to 130° C. for 20 hours. Evolution of hydrogen gas is observed. After 20 hours the reaction mixture is cooled to room temperature and an acetamide-modified silazane polymer in the form of a clear oil having a viscosity of 14,658 cp at 25° C. is obtained.

A one ounce glass jar is equipped with a stir bar and a septum and sparged with nitrogen. The jar is charged with the acetamide-modified polysilazane and 0.5 wt. % dicumyl peroxide is added. A nitrogen atmosphere is maintained in the jar using a nitrogen inlet needle and the reaction mixture is heated in an oil bath. When the temperature reaches 130° to 140° C., the reaction mixture changes from a clear oil to an opaque solid. A thermogravimetric analysis (TGA) is performed (10° C./min, nitrogen atmosphere, 25° to 950° C.). The solid acetamide-modified polysilazane has a TGA yield of 77 wt. % of a black ceramic material.

EXAMPLE 2

A one liter, three-necked, round-bottomed flask is equipped with an overhead mechanical stirrer with a TEFLON paddle, a water condenser and a septum and sparged with nitrogen. Poly(methylvinyl)silazane prepared as described in Example 1 is cannulated into a flask (545.4 g). Formamide (3.8 g) is added by syringe. The septum is replaced by a thermometer with an attached Thermowatch controller. The flask is equipped with a heating mantle and the reaction mixture is heated to 110° C. for 18 hours. Copious gas evolution (hydrogen) is observed. After cooling to room temperature, a light yellow polymer with a viscosity of 602 cp at 25° C. is obtained. The total recovered polymer is 534.7 g.

The formamide-modified polysilazane is cured by mixing with the amount of free radical generator indicated in Table 1 and heating. In each case a solid is obtained. The free radical generators used are dicumyl peroxide, bis(t-butylperoxy)diisopropylbenzene, o-trimethylsilyl-t-butylperoxide, hereafter referred to as silyl peroxide, and 2,2'-azobis(2-methylpropionitrile) (AIBN).

The solid initiators, dicumyl peroxide and bis(t-butylperoxy)diisopropylbenzene, are placed in a 17 ml vial. The vial is topped with a septum and sparged under nitrogen. The formamide-modified polysilazane is added by syringe. The vial is placed on a vortexer to thoroughly mix the initiator and the polymer. The vial is equipped with a thermocouple to monitor the exotherm upon cure, placed in a preheated 160° C. bath and timing is started. Timing is ended when the maximum exotherm is reached (designated as Maximum Temp. °C. in the table). Following the exotherm, the sample is removed from the bath and cooled to room temperature.

The AIBN is added in the same manner except that the samples are cured in a bath preheated to 130° C.

For the addition of the silyl peroxide, a 17 ml vial is equipped with a septum and sparged with nitrogen. The vial is charged with the polymer and 0.5 wt. % silyl peroxide by syringe. The sample is then cured in a 160° C. bath.

A thermogravimetric analysis (TGA) is performed on each sample (25° C./min., nitrogen atmosphere, 25°–1000° C.). The TGA yield of ceramic material in wt. % is given in Table 1.

TABLE 1

| Radical Generator | Wt. % Generator | Maximum Temp. (°C.) | Cure Time (Minutes) | TGA Yield (Wt. %) |
| --- | --- | --- | --- | --- |
| Dicumyl peroxide | 0.1 | 201.6 | 7.38 | 83.9 |
| | 0.5 | 226.6 | 2.87 | 80.8 |
| | 1.0 | 215.2 | 2.78 | 81.9 |
| | 5.0 | 221.3 | 1.78 | 77.8 |
| Bis(t-butylperoxy)-diisopropylbenzene | 0.1 | 184.7 | 7.25 | 78.6 |
| | 0.5 | 233.2 | 2.98 | 79.7 |
| | 1.0 | 220.3 | 3.00 | 79.9 |
| | 5.0 | 209.7 | 2.05 | 76.2 |
| AIBN | 0.5 | 135.5 | 4.13 | 76.9 |
| | 1.0 | 142.9 | 3.58 | 77.8 |

TABLE 1-continued

| Radical Generator | Wt. % Generator | Maximum Temp. (°C.) | Cure Time (Minutes) | TGA Yield (Wt. %) |
| --- | --- | --- | --- | --- |
| | 5.0 | 170.3 | 2.38 | 77.1 |
| Silyl peroxide | 0.5 | 218.3 | 9.90 | 80.7 |

EXAMPLE 3

An oven-dried, 100 ml, one-necked, round-bottomed flask is equipped with a stir bar and a septum and charged with 1.50 g of methylurea in a dry box. Poly(methylvinyl)silazane prepared as described in Example 1 is added by syringe (48.50 g). The septum is replaced with a water condenser with a nitrogen inlet on top. The reaction flask is placed in an oil bath equipped with a thermometer with an attached Thermowatch controller and the reaction mixture is heated to 110° C. for 18 hours. Copious gas evolution (hydrogen) is observed. After cooling to room temperature, a light yellow polymer with a viscosity of 12,227 cp at 25° C. is obtained.

The methylurea-modified polysilazane is cured using the amounts of benzoyl peroxide, bis(t-butylperoxy)-diisopropylbenzene and o-trimethylsilyl-t-butylperoxide indicated in Table 2, using the procedures described in Example 2. In each case a solid is obtained. The maximum temperature of the exotherm is given in the table.

A thermogravimetric analysis is performed on each sample as described in Example 2. The TGA yield of ceramic material in wt. % is given in Table 2.

TABLE 2

| Radical Generator | Wt. % Generator | Maximum Temp. (°C.) | TGA Yield (Wt. %) |
| --- | --- | --- | --- |
| Benzoyl peroxide | 0.5 | 168.0 | 72.0 |
| Bis(t-butylperoxy)-diisopropylbenzene | 0.5 | 183.6 | 80.3 |
| Silyl peroxide | 0.5 | 171.6 | 71.4 |

EXAMPLE 4

A 1 oz. jar is charged with 0.03 g of dicumyl peroxide and 5.0 g of the amide-modified polysilazane prepared as described in Example 2, using 0.7 wt. % formamide. The peroxide and amide-modified polysilazane are mixed on a vortexer. Silicon carbide powder (5.0 g, H. C. Starck, S7364A, A10) is added and the mixture is stirred with a spatula. The jar is topped with a septum, sparged with nitrogen, and placed in a 160° C. bath. After 7.8 minutes, an exotherm occurs that reaches 190.5° C. The mixture thermosets to a hard, coherent solid that is very tough and can be handled easily.

EXAMPLE 5

A 1 oz. jar is charged with 0.03 g of dicumyl peroxide and 5.0 g of the amide-modified polysilazane prepared as described in Example 2, using 0.7 wt. % formamide. The peroxide and amide-modified polysilazane are mixed on a vortexer. Silicon nitride powder (5.0 g, H. C. Starck, S2855, Grade S) is added and the mixture is stirred with a spatula. The jar is topped with a septum, sparged with nitrogen, and placed in a 160° C. bath. After 8.2 minutes, an exotherm occurs that reaches 199.8° C. The mixture thermosets to a hard, coherent solid that is very tough and can be handled easily.

I claim:

1. A (thio)amide-modified silazane polymer composition that is capable of being crosslinked by an energy input comprising (a) a (thio)amide-modified silazane polymer having at least one 2-6 carbon alkenyl or alkynyl group, and (b) at least one free radical generator in an amount effective to crosslink the (thio)amide-modified silazane polymer.

2. The composition according to claim 1, wherein the alkenyl group is a vinyl group.

3. The composition according to claim 1, wherein the free radical generator is an azo compound.

4. The composition according to claim 3, wherein the azo compound is 2,2'-azobis(2-methylpropionitrile).

5. The composition according to claim 1, wherein the free radical generator is a peroxide.

6. The composition according to claim 5, wherein the peroxide is dicumyl peroxide.

7. The composition according to claim 1 further comprising a filler.

8. The composition of claim 1, wherein the free radical generator is present in an amount of 0.01 to 5.0 wt. % of the (thio)amide-modified silazane polymer.

9. A process for crosslinking a (thio)amide-modified silazane polymer composition comprising a (thio)amide-modified silazane polymer and a free radical generator, said process comprising the step of exposing the (thio)amide-modified silazane polymer composition to an energy input in an amount effective to generate free radicals and crosslink the (thio)amide-modified silazane polymer.

10. The process according to claim 9, wherein the (thio)amide-modified silazane polymer composition is exposed to an energy input by heating to a temperature of 30° to 300° C.

11. The process according to claim 10, wherein the composition is heated to a temperature of 100° to 200° C.

* * * * *